United States Patent
Sakamoto et al.

(10) Patent No.: US 11,820,522 B2
(45) Date of Patent: Nov. 21, 2023

(54) PARACHUTE DEVICE, FLIGHT DEVICE, AND FLYING BODY EJECTION MECHANISM

(71) Applicant: MINEBEA MITSUMI Inc., Nagano (JP)

(72) Inventors: Yuzuru Sakamoto, Fujisawa (JP); Shoji Shimohisa, Fujisawa (JP); Yoshihiro Mochida, Minamisoma (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 17/755,251

(22) PCT Filed: Aug. 26, 2020

(86) PCT No.: PCT/JP2020/032126
§ 371 (c)(1),
(2) Date: Apr. 25, 2022

(87) PCT Pub. No.: WO2021/084872
PCT Pub. Date: May 6, 2021

(65) Prior Publication Data
US 2022/0363399 A1     Nov. 17, 2022

(30) Foreign Application Priority Data
Oct. 29, 2019   (JP) .................. 2019-196198

(51) Int. Cl.
*B64D 17/80*     (2006.01)
*B64C 19/00*     (2006.01)
(Continued)

(52) U.S. Cl.
CPC .............. *B64D 17/80* (2013.01); *B64C 19/00* (2013.01); *B64C 39/024* (2013.01); *B64D 1/02* (2013.01); *B64D 47/00* (2013.01)

(58) Field of Classification Search
CPC .......... B64D 17/80; B64D 1/02; B64D 47/00; B64C 19/00
See application file for complete search history.

(56) References Cited

U.S. PATENT DOCUMENTS

| 4,750,692 A * | 6/1988 | Howard ................ B64G 1/646 244/172.6 |
| 2019/0016468 A1* | 1/2019 | Robertson .............. B64D 17/80 |

(Continued)

FOREIGN PATENT DOCUMENTS

| JP | 4785084 B2 | 10/2011 |
| WO | 2018/190319 A1 | 10/2018 |

OTHER PUBLICATIONS

Notice of Reasons for Refusal dated Dec. 13, 2022 in the corresponding Japanese Application No. 2019-196198 and English translation.
(Continued)

*Primary Examiner* — Tye William Abell
(74) *Attorney, Agent, or Firm* — Pearne & Gordon LLP

(57) ABSTRACT

Provided is a parachute device capable of reliably opening a parachute. A parachute device includes a parachute, a parachute accommodation section formed in a tubular shape including an opening at one end and a bottom at another end, the parachute accommodation section being configured to accommodate the parachute inside the parachute accommodation section, at least one flying body formed in a tubular shape including an opening at one end and a bottom at another end, the flying body being connected to the parachute, a tubular ejection section fixed at the parachute accommodation section, and configured to hold the flying body and eject the held flying body, a gas generating device fixed at the parachute accommodation section, and configured to generate gas, and a gas introduction path configured to introduce the gas generated from the gas generating
(Continued)

device to an interior of the ejection section, wherein at the ejection section, one open end portion of the ejection section is inserted into the flying body, and another open end portion of the ejection section communicates with the gas introduction path.

6 Claims, 6 Drawing Sheets

(51) Int. Cl.
  *B64C 39/02* (2023.01)
  *B64D 1/02* (2006.01)
  *B64D 47/00* (2006.01)

(56) References Cited

U.S. PATENT DOCUMENTS

2020/0115049 A1* 4/2020 Nakamura ........... B64D 17/025
2020/0216181 A1* 7/2020 Yagihashi ............ B64C 31/036

OTHER PUBLICATIONS

International Preliminary Report on Patentability for corresponding International Application No. PCT/JP2020/032126 dated Oct. 27, 2020.
Written Opinion for corresponding International Application No. PCT/JP2020/032126 dated Oct. 27, 2020 and English translation.

* cited by examiner

PARACHUTE DEVICE, FLIGHT DEVICE, AND FLYING BODY EJECTION MECHANISM

CROSS-REFERENCE TO RELATED APPLICATIONS

This application is a national stage entry of International Application No. PCT/JP2020/032126 filed on Aug. 26, 2020, which claims the benefit of priority to Japanese Application No. JP2019-196198, filed Oct. 29, 2019, the entire disclosures of which are hereby incorporated herein by reference.

TECHNICAL FIELD

The present invention relates to a parachute device, a flight device, and a flying body ejection mechanism, and relates to, for example, a parachute device attached to a flight device being of the multi-rotor rotary wing aircraft type capable of remote control and autonomous flight.

BACKGROUND ART

In recent years, practical use of flight devices being of the multi-rotor rotary wing aircraft type capable of remote control and autonomous flight (hereinafter, also simply referred to as "rotary wing aircraft") in industrial fields has been considered. For example, in the transportation industry, transport of loads, transport of passengers, and the like by using a rotary wing aircraft (so-called drone) have been considered.

A rotary wing aircraft for transport has an autonomous flight function of flying while identifying an own position by global positioning system (GPS) signals or the like. However, when an abnormality occurs at the rotary wing aircraft due to some cause, there is a risk that autonomous flight may not be possible and an accident such as falling of the rotary wing aircraft may occur. Thus, improvement in safety of the rotary wing aircraft is desired.

In particular, it is expected that the body size of the rotary wing aircraft for transport will increase so as to be able to transport larger loads and passengers. When such a large rotary wing aircraft is in an uncontrollable state and falls due to some cause, there is a risk of severe damage to people or structures compared to known rotary wing aircraft. Thus, when the size of the rotary wing aircraft is increased, safety needs to be emphasized more than ever.

Therefore, in order to improve the safety of the rotary wing aircraft, the inventors of the present application have studied attaching a parachute device for a flying body as disclosed in, for example, Patent Document 1 below, to the rotary wing aircraft.

CITATION LIST

Patent Literature

Patent Document 1: JP 4785084 B

SUMMARY OF INVENTION

Technical Problem

However, studies by the inventors have revealed that a conventional parachute for a flying body is designed such that the parachute is easily opened by an air current generated during flying, and thus when the parachute falls from a stationary state in the sky, the effect of the air current is not immediately obtained, and there is a possibility that the parachute is not immediately opened.

The present invention has been made in view of the above-described problems, and an object of the present invention is to provide a parachute device capable of reliably opening a parachute even when an effect of an airflow during flying or falling of a flight device is not immediately obtained.

Solution to Problem

A parachute device according to an exemplary embodiment of the present invention includes a parachute, a parachute accommodation section formed in a tubular shape including an opening at one end and a bottom at another end, the parachute accommodation section being configured to accommodate the parachute inside the parachute accommodation section, at least one flying body formed in a tubular shape including an opening at one end and a bottom at another end, the flying body being connected to the parachute, a tubular ejection section fixed at the parachute accommodation section, and configured to hold the flying body and eject the held flying body, a gas generating device fixed at the parachute accommodation section, and configured to generate gas, and a gas introduction path configured to introduce the gas generated from the gas generating device to an interior of the ejection section, wherein one open end portion of the ejection section is inserted into the flying body, and another open end portion of the ejection section communicates with the gas introduction path.

Advantageous Effects of Invention

According to one aspect of the present invention, it is possible to provide a parachute device capable of reliably opening a parachute even when an effect of an airflow during flying or falling of a flight device is not immediately obtained.

DESCRIPTION OF EMBODIMENTS

1. Overview of Embodiment

Figure 1:
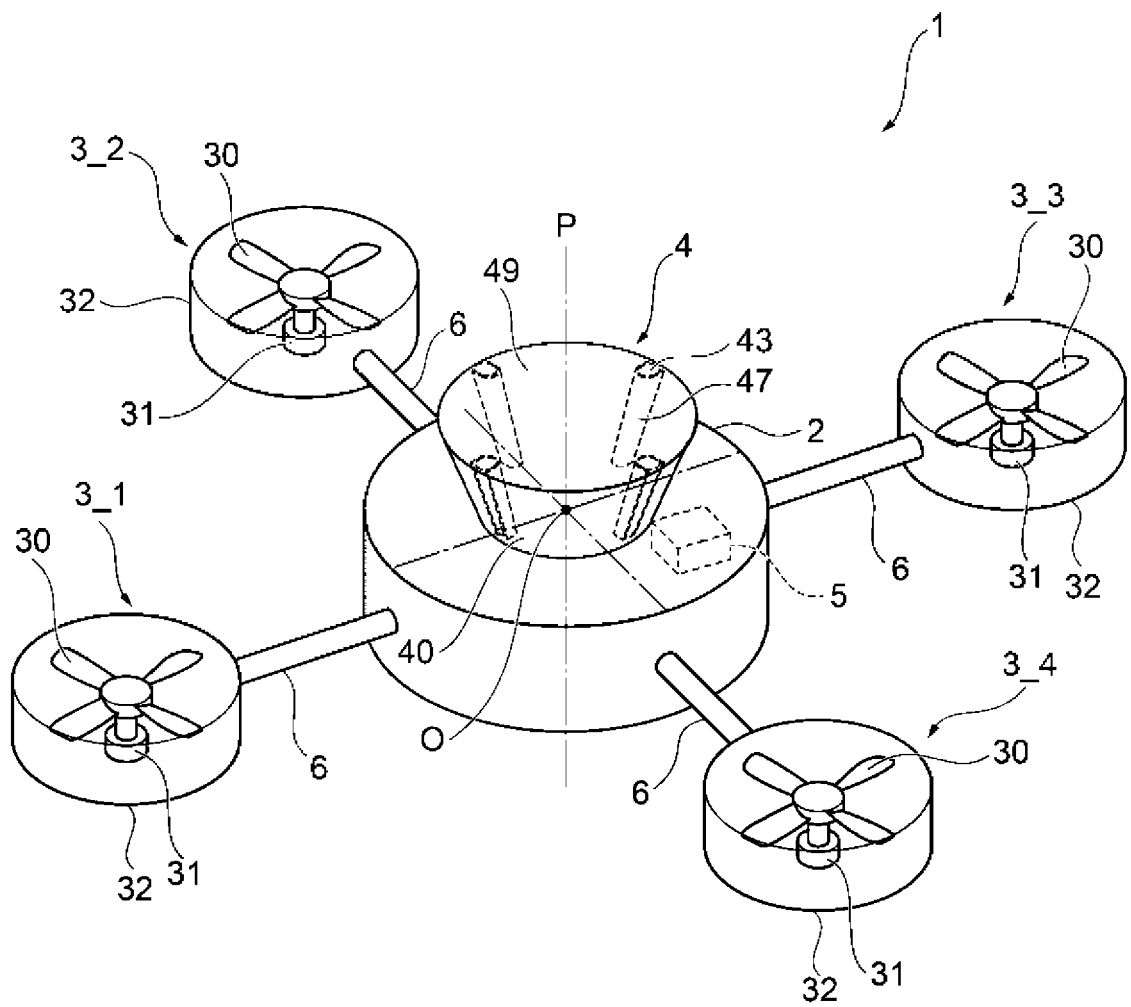
FIG. 1 is a diagram schematically illustrating an appearance of a flight device equipped with a parachute device according to the present embodiment.

First, an overview of a typical embodiment of the invention disclosed in the present application will be described. Note that, in the following description, reference signs in the drawings corresponding to the constituent elements of the invention are mentioned in parentheses as an example.

[1] A parachute device (4) according to an exemplary embodiment of the present invention includes a parachute (400), a parachute accommodation section (40) formed in a tubular shape including an opening at one end and a bottom at another end, the parachute accommodation section being configured to accommodate the parachute inside the parachute accommodation section, at least one flying body (43) formed in a tubular shape including an opening at one end and a bottom at another end, the flying body being connected to the parachute, a tubular ejection section (41) fixed at the parachute accommodation section, and configured to hold the flying body and eject the held flying body, a gas generating device (44) fixed at the parachute accommodation section, and configured to generate gas, and a gas introduction path (45) configured to introduce the gas generated from the gas generating device to an interior of the ejection section, wherein one open end portion of the ejection section is inserted into the flying body, and another open end portion of the ejection section communicates with the gas introduction path.

[2] In the parachute device (4) described above, the gas generating device may include a gas generating agent (441) configured to generate the gas, and a housing (444) fixed at an inner bottom surface (404a) of the parachute accommodation section, and configured to non-detachably accommodate the gas generating agent, a gas discharge chamber (446) may be formed by the housing and the inner bottom surface of the parachute accommodation section, the gas generated from the gas generating agent being discharged into the gas discharge chamber, and the gas discharge chamber and the interior of the ejection section may communicate with each other via the gas introduction path.

[3] The parachute device (4) described above may further include a cover member (47) disposed between the parachute and the flying body in the parachute accommodation section in a form surrounding the flying body held by the ejection section.

[4] The parachute device (4) described above may further include a lid (49) configured to cover an opening portion of the parachute accommodation section.

[5] The parachute device (4) described above may include a plurality of the flying bodies, wherein the ejection section and the gas introduction path may be provided corresponding to each of the flying bodies, the parachute accommodation section may be a tubular container, the gas generating device may be disposed at a central portion (P) of the parachute accommodation section when viewed from an opening portion side of the parachute accommodation section, and a plurality of the ejection sections may be disposed at equal intervals in a circumferential direction of a circle centered on the central portion when viewed from the opening portion side of the parachute accommodation section.

[6] A flight device (1) according to a typical embodiment of the present invention includes an aircraft body unit (2), a thrust force generation section (3, 3_1 to 3_n) connected to the aircraft body unit and configured to generate a thrust force, a flight control section (14) configured to control the thrust force generation section, an abnormality detection section (15) configured to detect an abnormality during flying, the parachute device (4) according to any one of [1] to [5], and a fall control section (16) configured to cause the flying body to be ejected from the ejection section in response to detection of the abnormality by the abnormality detection section.

[7] A flying body ejection mechanism (50) according to a typical embodiment of the present invention includes a flying body (43) connectable to a parachute (400), a parachute accommodation section (40) formed in a tubular shape including an opening at one end and a bottom at another end, the parachute accommodation section being capable of accommodating the parachute inside the parachute accommodation section, a tubular ejection section (41) fixed at the parachute accommodation section, and configured to hold the flying body and eject the held flying body, a gas generating device (44) fixed at the parachute accommodation section, and configured to generate gas, and a gas introduction path (45) configured to introduce the gas generated from the gas generating device to an interior of the ejection section, wherein the flying body is formed in a tubular shape including an opening at one end and a bottom at another end, and one open end portion (410) of the ejection section is inserted into the flying body, and another open end portion (411) of the ejection section communicates with the gas introduction path.

2. Specific Examples of Embodiments

Hereinafter, specific examples of the embodiments of the present invention will be described with reference to the accompanying drawings. Note that, in the following description, constituent elements common to each of the embodiments are denoted with the same reference signs and repeated descriptions will be omitted. Furthermore, it should be noted that the drawings are schematic drawings and the dimensional relationships, proportions, and the like between elements in the drawings may differ from reality. Among the drawings, parts having mutually different dimensional relationships and proportions may be included.

Embodiment 1

FIG. 1 is a diagram schematically illustrating an appearance of a flight device equipped with a parachute device according to the present embodiment. A flight device 1 illustrated in FIG. 1 is, for example, a flight device being of the multi-rotor rotary wing aircraft type equipped with three or more rotors, and is a so-called drone.

As illustrated in FIG. 1, the flight device 1 includes an aircraft body unit 2, thrust force generation sections 3_1 to 3_n (n being an integer equal to or greater than 3), a parachute device 4, a notification device 5, and arm sections 6.

The aircraft body unit 2 is a main body portion of the flight device 1. As will be described below, the aircraft body unit 2 accommodates various functional sections for controlling flying of the flight device 1. Note that in FIG. 1, the aircraft body unit 2 having a cylindrical shape is illustrated as an example, but a shape of the aircraft body unit 2 is not particularly limited.

The thrust force generation sections 3_1 to 3_n are rotors configured to generate a thrust force. Note that, in the following description, when each of the thrust force generation sections 3_1 to 3_n is not specifically distinguished, each of the thrust force generation sections is simply referred to as a "thrust force generation section 3".

The thrust force generation section 3 has, for example, a structure of accommodating a propeller 30, and a motor 31 configured to rotate the propeller 30 in a case 32 having a tubular shape. A net (for example, a resin material, a metal material (stainless steel, or the like), or the like) for preventing contact with the propeller 30 may be provided at an opening portion of the case 32 having the tubular shape.

The number n of the thrust force generation sections 3 provided at the flight device 1 is not particularly limited, but is preferably three or more. For example, the flight device 1 may be any of a tricopter provided with three thrust force generation sections 3, a quadcopter provided with four thrust force generation sections 3, a hexacopter provided with six thrust force generation sections 3, and an octocopter provided with eight thrust force generation sections 3.

Note that in FIG. 1, a case of the flight device 1 being a quadcopter equipped with four (n=4) thrust force generation sections 3_1 to 3_4 is illustrated as an example.

An arm section 6 has a structure for connecting the aircraft body unit 2 and each of the thrust force generation sections 3. The arm section 6 is formed so as to radially protrude from the aircraft body unit 2, for example, from a central portion O of the aircraft body unit 2. A corresponding one of the thrust force generation sections 3 is attached to a tip end of each of the arm sections 6.

The notification device 5 is a device for notifying the outside of the flight device 1 of danger. The notification device 5 is configured by including a light source formed of, for example, a light emitting diode (LED) or the like, or a sound generation device (an amplifier, a speaker, and the like). In response to detection of abnormalities by the abnormality detection section 15 to be described below, the notification device 5 notifies, by using light or sound, the outside that the flight device 1 is in a dangerous state.

Note that the notification device 5 may be exposed to the outside of the aircraft body unit 2, or may be accommodated in the interior of the aircraft body unit 2 in a form capable of outputting light generated from a light source, sound generated from a speaker, or the like to the outside.

The parachute device 4 is a device for slowing the falling speed of the flight device 1 and causing the flight device 1 to fall in a safe manner when an abnormality occurs at the flight device 1 and there is a risk of falling. As illustrated in FIG. 1, for example, the parachute device 4 is installed on the aircraft body unit 2. Note that the specific configuration of the parachute device 4 will be described later.

Figure 2:
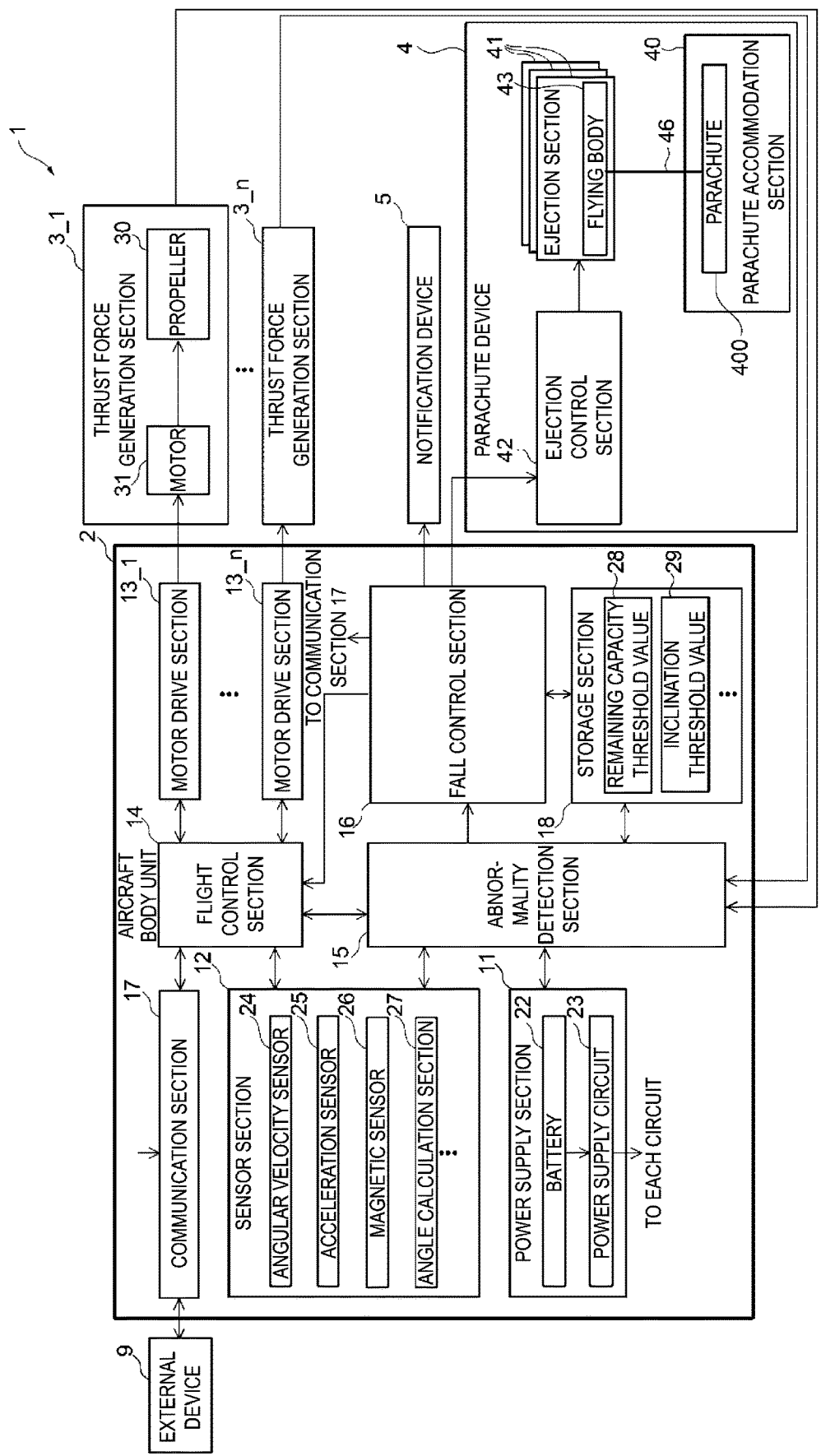
FIG. 2 is a functional block diagram of the flight device equipped with the parachute device according to the present embodiment.

FIG. 2 is a functional block diagram of the flight device 1 equipped with the parachute device 4 according to the embodiment.

As illustrated in FIG. 2, the aircraft body unit 2 includes a power supply section 11, a sensor section 12, motor drive sections 13_1 to 13_n (n being an integer equal to or greater than 3), a flight control section 14, an abnormality detection section 15, a fall control section 16, a communication section 17, and a storage section 18.

Among these functional sections, the flight control section 14, the abnormality detection section 15, and the fall control section 16 are achieved by, for example, a program processing by a program processing device (for example, a microcontroller) including a central processing unit (CPU) and a memory.

The power supply section 11 includes a battery 22 and a power supply circuit 23. The battery 22 is, for example, a secondary battery (for example, a lithium-ion secondary battery). The power supply circuit 23 is a circuit configured to generate a power supply voltage based on an output voltage of the battery 22 to supply the power supply voltage to each hardware entity configuring the above-described functional sections. The power supply circuit 23 includes, for example, a plurality of regulator circuits, and supplies a power supply voltage having an appropriate magnitude for each hardware entity described above.

The sensor section 12 is a functional section for detecting a state of the flight device 1. The sensor section 12 detects an inclination of the aircraft body of the flight device 1. The sensor section 12 includes an angular velocity sensor 24, an acceleration sensor 25, a magnetic sensor 26, and an angle calculation section 27.

The angular velocity sensor 24 is a sensor for detecting an angular velocity (rotational velocity). For example, the angular velocity sensor 24 is a triaxial gyro sensor configured to detect an angular velocity based on three reference axes of an x-axis, a y-axis, and a z-axis.

The acceleration sensor 25 is a sensor for detecting an acceleration. For example, the acceleration sensor 25 is a triaxial acceleration sensor for detecting an acceleration based on three reference axes of the x-axis, the y-axis, and the z-axis.

The magnetic sensor 26 is a sensor for detecting terrestrial magnetism. For example, the magnetic sensor 26 is a triaxial geomagnetic sensor (electronic compass) for detecting an azimuth (absolute direction) based on three reference axes of the x-axis, the y-axis, and the z-axis.

The angle calculation section 27 calculates an inclination of the aircraft body of the flight device 1 based on a detection result of at least one of the angular velocity sensor 24 and the acceleration sensor 25. Here, the inclination of the aircraft body of the flight device 1 is an angle of the aircraft body (the aircraft body unit 2) with respect to the ground (horizontal direction).

For example, the angle calculation section 27 may calculate an angle of the aircraft body with respect to the ground based on a detection result of the angular velocity sensor 24, or may calculate an angle of the aircraft body with respect to the ground based on detection results of the angular velocity sensor 24 and the acceleration sensor 25. Note that, as a method of calculating an angle by using detection results of the angular velocity sensor 24 and the acceleration sensor 25, a known calculation equation may be used.

Additionally, the angle calculation section 27 may correct, based on a detection result of the magnetic sensor 26, the angle calculated based on the detection result of at least one of the angular velocity sensor 24 and the acceleration sensor 25. Similarly to the flight control section 14 and the like, for example, the angle calculation section 27 is implemented by program processing by a microcontroller.

Note that, in addition to the angular velocity sensor 24, the acceleration sensor 25, and the magnetic sensor 26 described above, the sensor section 12 may include, for example, an air pressure sensor, an air volume (wind direction) sensor, an ultrasonic sensor, a GPS receiver, a camera, and the like.

The communication section 17 is a functional section for communicating with an external device 9. Here, the external device 9 is a transmitter, a server, or the like configured to control an operation of the flight device 1 and to monitor a status of the flight device 1. The communication section 17 is configured by, for example, an antenna, a radio frequency (RF) circuit, and the like. Communication between the communication section 17 and the external device 9 is achieved, for example, by wireless communication in an ISM band (2.4 GHz band).

The communication section 17 receives operation information of the flight device 1 transmitted from the external device 9 to output the operation information to the flight control section 14, and transmits various measurement data and the like measured by the sensor section 12 to the external device 9. In addition, when an abnormality of the flight device 1 is detected by the abnormality detection section 15, the communication section 17 transmits, to the external device 9, information indicating that an abnormality has occurred at the flight device 1. Furthermore, the communication section 17 transmits, to the external device 9, information indicating that the flight device 1 has fallen when the flight device 1 falls to the ground.

The motor drive sections 13_1 to 13_n are provided for the respective thrust force generation sections 3_n, and are functional sections for driving the motors 31 to be driven in accordance with an instruction from the flight control section 14.

Note that, in the following description, when each of the motor drive sections 13_1 to 13_n is not specifically distinguished, each of the motor drive sections 13_1 to 13_n is simply referred to as a "motor drive section 13".

The motor drive section 13 drives the motor 31 such that the motor 31 rotates at the number of rotations instructed from the flight control section 14. For example, the motor drive section 13 is an electronic speed controller (ESC).

The flight control section 14 is a functional section for comprehensively controlling the respective functional sections of the flight device 1.

The flight control section 14 controls the thrust force generation sections 3 so that the flight device 1 stably flies. Specifically, the flight control section 14 calculates the appropriate number of rotations of the motor 31 of each thrust force generation section 3 so that the aircraft body stably flies in a desired direction, based on operation information received by the communication section 17 from the external device 9 (instructions for ascending, descending, advancing, retreating, and the like), and detection results of the sensor section 12, and instructs the calculated number of rotations to each motor drive section 13.

The flight control section 14 calculates the appropriate number of rotations of the motor 31 of each thrust force generation section 3 such that the aircraft body becomes horizontal, based on a detection result of the angular velocity sensor 24 when a posture of the aircraft body is disturbed, for example, due to an external influence such as wind, and instructs the calculated number of rotations to each motor drive section 13.

In addition, for example, the flight control section 14 calculates the appropriate number of rotations of the motor 31 of each thrust force generation section 3 based on a detection result of the acceleration sensor 25 in order to prevent drift of the flight device 1 during hovering of the flight device 1, and instructs the calculated number of rotations to each motor drive section 13.

Additionally, the flight control section 14 controls the communication section 17 to achieve transmission and reception of the various data described above to and from the external device 9.

The storage section 18 is a functional section for storing various programs, parameters, and the like for controlling operations of the flight device 1. For example, the storage section 18 is configured of a non-volatile memory such as a flash memory and a ROM, a RAM, and the like.

The above-described parameters stored in the storage section 18 are, for example, a remaining capacity threshold value 28, an inclination threshold value 29, and the like to be described below.

The abnormality detection section 15 is a functional section for detecting an abnormality during flying. Specifically, the abnormality detection section 15 monitors detection results of the sensor section 12, a state of the battery 22, and operation states of the thrust force generation sections 3, and determines whether the flight device 1 is in an abnormal state or not.

Here, the abnormal state refers to a state where autonomous flight of the flight device 1 may become impossible. For example, a state where at least one of a case where the thrust force generation section 3 has broken down, a case where a remaining capacity of the battery 22 has dropped below a predetermined threshold value, and a case where the aircraft body (the aircraft body unit 2) is abnormally inclined occurs is referred to as the abnormal state.

When the abnormality detection section 15 detects a failure of the thrust force generation section 3, the abnormality detection section 15 determines that the flight device 1 is in the abnormal state. Here, the "failure of the thrust force generation section 3" refers to, for example, a case where the motor 31 does not rotate at the number of rotations specified by the flight control section 14, a case where the propeller 30 does not rotate, a case where the propeller 30 has broken down, and the like.

In addition, when the abnormality detection section 15 detects that the remaining capacity of the battery 22 has dropped below a predetermined threshold value (hereinafter, also referred to as the "remaining capacity threshold value") 28, the abnormality detection section 15 determines that the flight device 1 is in the abnormal state.

Here, the remaining capacity threshold value 28 may be such a capacity value that the motor cannot rotate at the number of rotations instructed by the flight control section 14, for example. The remaining capacity threshold value 28 is stored in advance in the storage section 18, for example.

In addition, when the abnormality detection section 15 detects an abnormal inclination of the flight device 1 (aircraft body), the abnormality detection section 15 determines that the flight device 1 is abnormal. For example, the abnormality detection section 15 determines that the flight device 1 is in the abnormal state when a state where an angle calculated by the angle calculation section 27 exceeds a predetermined threshold value (hereinafter, also referred to as the "inclination threshold value") 29 continues for a predetermined period of time.

For example, an angle (pitch angle) when the flight device 1 moves in a front and rear direction and an angle (roll angle) when the flight device 1 moves in a left and right direction are obtained in advance by experimentation. The inclination threshold value 29 may be set to a value larger than the angles obtained by the experiment. The inclination threshold value 29 is stored in advance in the storage section 18, for example.

The fall control section 16 is a functional section for controlling falling of the flight device 1. Specifically, when the abnormality detection section 15 detects that the flight device 1 is in the abnormal state, the fall control section 16 performs fall preparation processing for causing the flight device 1 to fall in a safe manner.

Specifically, the fall control section 16 performs the following processing as the fall preparation processing. In other words, the fall control section 16 controls the notification device 5 in response to the detection of the abnormality by the abnormality detection section 15, and notifies the outside of a dangerous state. In addition, the fall control section 16 controls the respective motor drive sections 13 in response to the detection of the abnormality by the abnormality detection section 15 to stop the rotation of each motor 31. Furthermore, in response to the detection of the abnormality by the abnormality detection section 15, the fall control section 16 outputs a control signal for instructing opening of a parachute to the parachute device 4 to open a parachute 400.

Next, the parachute device 4 according to the embodiment will be described in detail.

Figure 3:
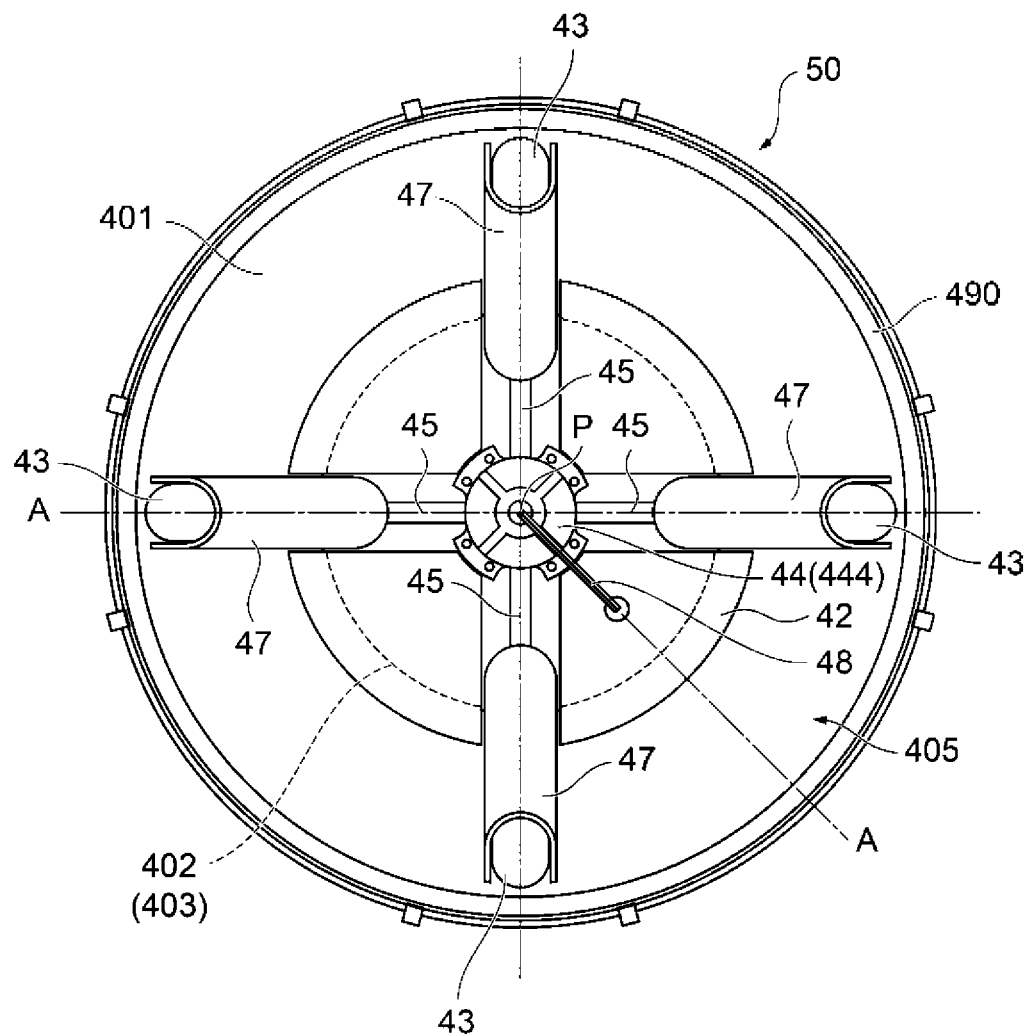
FIG. 3 is a top view of the parachute device according to the present embodiment.
Figure 4:
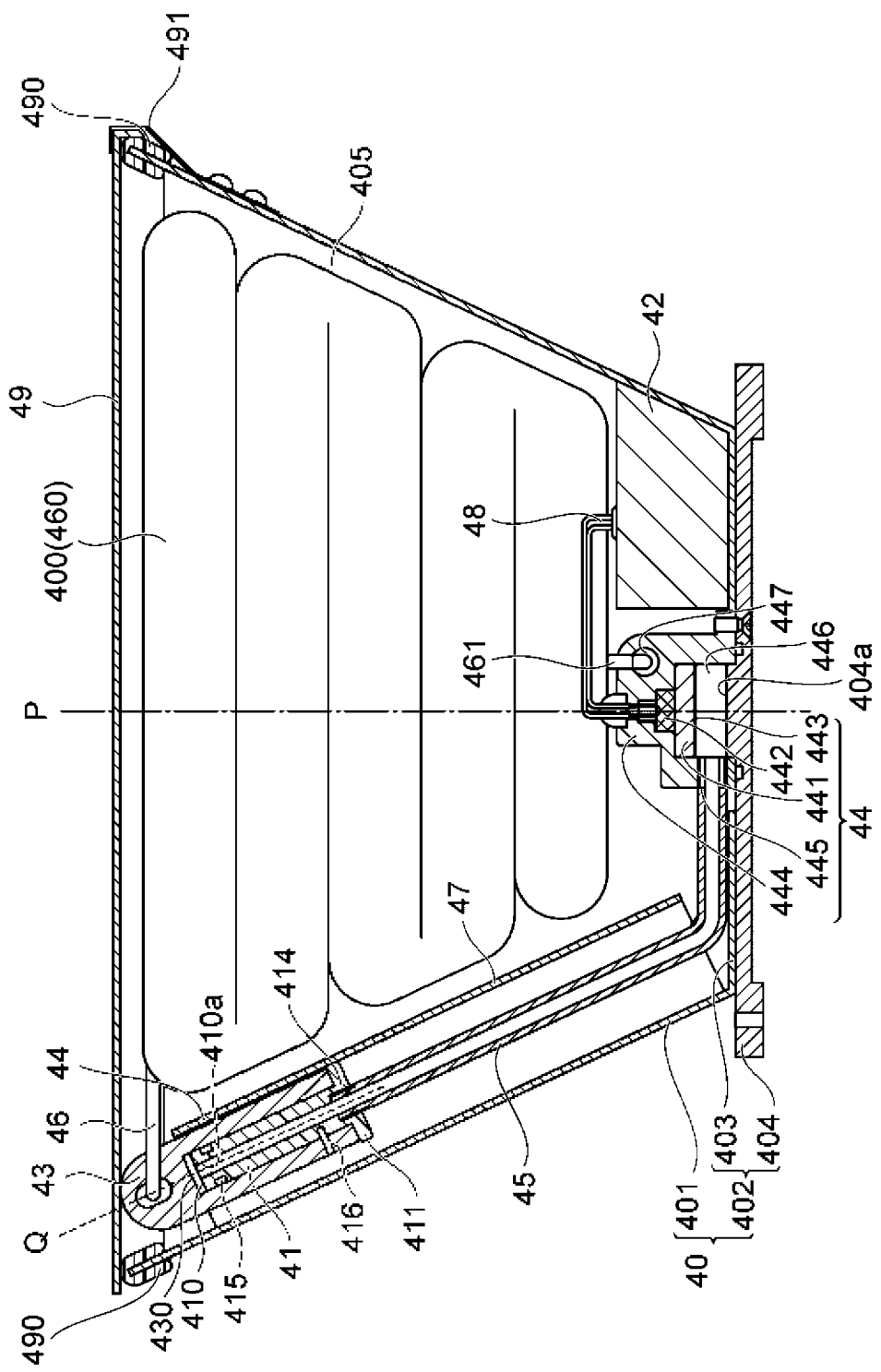
FIG. 4 is a partial cross-sectional view of the parachute device according to the present embodiment taken along the line A-A in FIG. 3.

FIGS. 3 and 4 are diagrams schematically illustrating the configuration of the parachute device 4 according to the embodiment. FIG. 3 illustrates a top view of the parachute device 4, and FIG. 4 illustrates a partial cross-sectional view of the parachute device 4 taken along the plane A-A in FIG. 3. Note that, in FIG. 3, the parachute 400 and a lid 49 are not illustrated.

As illustrated in FIGS. 3 and 4, the parachute device 4 includes the parachute 400, the parachute accommodation section 40, an ejection section 41, an ejection control section 42, a flying body 43, a gas generating device 44, a gas introduction path 45, a connection line 46, a cover member 47, and the lid 49.

Figure 5:
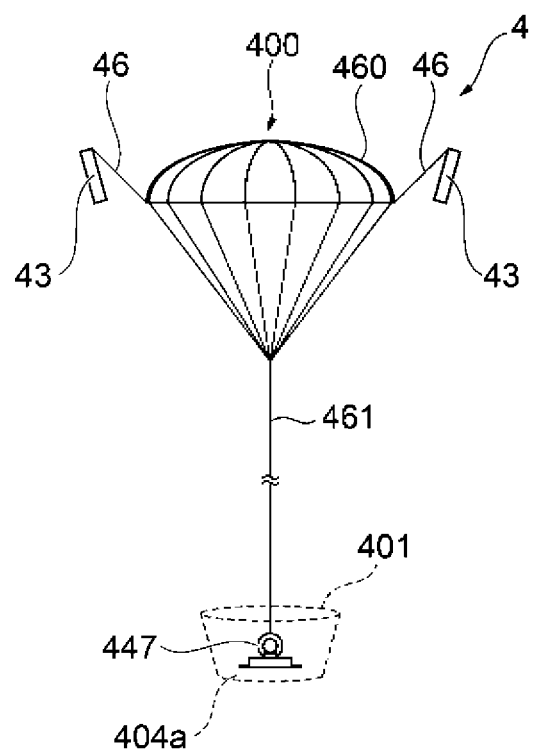
FIG. 5 is a diagram schematically illustrating an open state of a parachute.

FIG. 5 is a diagram schematically illustrating an open state of the parachute 400.

As illustrated in FIG. 5, the parachute 400 includes a parachute body (canopy) 460 and a hanging line 461.

The hanging line 461 connects the parachute body 460 and the parachute accommodation section 40 (a parachute attachment section 447). The parachute body 460 is connected to the flying bodies 43 by the connection lines 46. For example, as illustrated in FIG. 5, the connection lines 46 are connected to the parachute body 460 at the edge (peripheral edge) side of the parachute body 460. More specifically, the connection lines 46 are separated from each other and connected to the peripheral edge portion of the parachute body 460. For example, as illustrated in FIG. 5, when the parachute 400 (the parachute body 460) in the open state has a circular shape when viewed from the apex side of the parachute body 460, the connection lines 46 are connected to the peripheral edge portion of the parachute body 460 at equal intervals along the circumferential direction of the parachute body 460.

Note that when only one flying body 43 is provided, the connection line 46 may be connected at any one position of the peripheral edge portion of the parachute 400. In this case, the position at the peripheral edge portion of the parachute 400 connected with the connection line 46 is not particularly limited.

The connection line 46 is formed of, for example, a metal material (for example, stainless steel) or a fiber material (for example, a nylon string).

Here, a diameter D of the parachute body 460 required to cause the flight device 1 to fall at a low speed can be calculated, for example, based on the following Equation (1). In Equation (1), m is a total weight of the flight device 1, v is a falling speed of the flight device 1, $\rho$ is an air density, and Cd is a resistance coefficient.

[Equation 1]

$$D = \frac{2}{v}\sqrt{\frac{2\,mg}{\rho \pi \cdot Cd}} \ldots \quad (1)$$

For example, when the total weight m of the flight device 1 is 250 [kg], the resistance coefficient Cd is 0.9, and the air density $\rho$ is 1.3 kg/m, a diameter D of the parachute body 460 required to make the falling speed v of the flight device 1 be 5 [m/s] is calculated to be 14.6 [m] from Equation (1).

For example, as illustrated in FIG. 4, the parachute 400 is accommodated in the parachute accommodation section 40 with the parachute body 460 folded before use of the parachute 400.

The parachute accommodation section 40 is a container configured to accommodate the parachute 400. As illustrated in FIGS. 3 and 4, the parachute accommodation section 40 is formed, for example, in a tubular shape (for example, a cylindrical shape) including an opening at one end and a bottom at another end.

As illustrated in FIG. 1, the parachute accommodation section 40 is set at the upper surface of the aircraft body unit 2, that is, at a surface facing a side opposite to the ground during flying of the flight device 1. For example, the parachute accommodation section 40 is preferably installed such that the central portion O of the aircraft body unit 2 and a central axis P of the parachute accommodation section 40 overlap with each other at the upper surface of the aircraft body unit.

The parachute accommodation section 40 has a side wall portion 401 having a tube shape and a bottom portion 402 formed so as to close an opening at one end side of the side wall portion 401. The parachute accommodation section 40 is configured of, for example, resin.

The side wall portion 401 has a tapered tube shape, for example. More specifically, as illustrated in FIGS. 1 and 4, the side wall portion 401 has a truncated conical outer shape with an area of an upper surface and an area of a lower surface being different from each other.

The bottom portion 402 includes, for example, a bottom surface portion 403 and a base portion 404 joined to the bottom surface portion 403. The bottom surface portion 403 along with the side wall portion 401 defines an accommodation space 405 for accommodating the parachute 400, the gas generating device 44, and the ejection control section 42.

The side wall portion 401 and the bottom surface portion 403 may be integrally molded as, for example, a resin molded product, or may be formed as separate components and joined to each other. In the present embodiment, it is assumed that the side wall portion 401 and the bottom surface portion 403 are integrally molded.

The base portion 404 is a component for fixing the parachute device 4 (the parachute accommodation section 40) at the aircraft body unit 2 of the flight device 1. The base portion 404 is made of, for example, a resin or a metal (stainless steel, and the like). The base portion 404 is joined to the surface of the bottom surface portion 403 opposite to the accommodation space 405 side. The base portion 404 is fixed at the upper surface of the aircraft body unit 2 by a fixing member such as an external thread, for example. Note that the base portion 404 may be integrally formed with the bottom surface portion 403.

As illustrated in FIG. 4, the parachute accommodation section 40 may be provided with the lid 49 covering the opening portion of the parachute accommodation section 40 (the side wall portion 401). The lid 49 may be formed of, for example, a resin material or may be a thin film member. The lid 49 is preferably disposed to entirely cover the opening portion of the parachute accommodation section 40 so that the flying body 43 and the ejection section 41 installed at the side wall portion 401 are not exposed to the outside. Thus, it is possible to prevent rain or dust, and the like from entering the interior of the parachute accommodation section 40.

As illustrated in FIG. 4, a sealing device (gasket) 490 may be provided between the lid 49 and the opening portion of the parachute accommodation section 40, that is, between the lid 49 and the edge of the side wall portion 401.

The lid 49 is fixed at the side wall portion 401 by, for example, a removable fitting 491. For example, the fitting 491 fixes the lid 49 at the side wall portion 401 with such a fastening force that the lid 49 is easily detached when the flying body 43 ejected from the ejection section 41 comes into contact with the lid 49.

A lead wire 48 is an electrical wire for igniting the gas generating device 44. The lead wire 48 is configured of, for example, a vinyl wire, a tin-plated wire, an enamel wire, and the like. One end of the lead wire 48 is connected to the gas generating device 44, and the other end of the lead wire 48 is connected to the ejection control section 42.

The ejection control section 42 is a circuit configured to perform control for ejecting the flying body 43 from the ejection section 41. As illustrated in FIGS. 3 and 4, the ejection control section 42 is fixed, for example, on the inner surface of the bottom portion 402 (bottom surface portion 403) in the parachute accommodation section 40. The ejection control section 42 is, for example, an electronic circuit configured to output an ignition signal when receiving a control signal for instructing the opening of the parachute 400 from the fall control section 16 in the aircraft body unit 2. The ignition signal is input to the gas generating device 44 through the lead wire 48, and thus, an ignition agent 442 to be described later is ignited to generate gas from the gas generating device 44. As will be described later, the flying body 43 obtains a thrust force by receiving the pressure of the gas generated from the gas generating device 44, and is ejected from the ejection section 41.

The parachute device 4 includes at least one flying body 43. For example, the parachute device 4 preferably includes three or more flying bodies 43. In the present embodiment, as an example, as illustrated in FIG. 1, a case of the parachute device 4 including four flying bodies will be described as an example. Note that a specific configuration of the flying body 43 will be described below.

The parachute accommodation section 40, the ejection section 41, the ejection control section 42, the flying body 43, the gas generating device 44, and the gas introduction path 45, the cover member 47, and the lead wire 48 constitute a single flying body ejection mechanism 50 as described above.

The ejection section 41 is a component for holding the flying body 43 and ejecting the held flying body 43. The ejection section 41 is provided for each flying body 43. As illustrated in FIG. 1, the parachute device 4 includes the four ejection sections 41 for individually accommodating the four flying bodies 43.

The ejection sections 41 are provided at the parachute accommodation section 40. Specifically, each of the ejection sections 41 is provided at the inner peripheral surface of the side wall portion 401. For example, as illustrated in FIGS. 3 and 4, each ejection section 41 is provided at the inner peripheral surface of the side wall portion 401 via the cover member 47 to be described later.

Here, the ejection section 41 is inclined with respect to the central axis P of the parachute accommodation section 40 such that an end portion of the ejection section 41 in an ejection direction of the flying body 43 (a direction of extension of the central axis Q of the cylindrical ejection section 41) is away from the central axis P of the parachute accommodation section 40.

Further, the plurality of ejection sections 41 are disposed at equal intervals in the circumferential direction of a circle centered on the central portion of the parachute accommodation section 40 (for example, the central axis P of the parachute accommodation section 40) when viewed from the opening portion side of the parachute accommodation section 40. For example, when the parachute device 4 includes four ejection sections 41, as illustrated in FIG. 3, the ejection sections 41 are disposed at intervals of 90° (=360°/4) in the circumferential direction of a circle centered on the central axis P of the parachute accommodation section 40.

As illustrated in FIG. 4, the ejection section 41 is formed in a tubular shape (for example, a cylindrical shape). One open end portion 410 of the ejection section 41 is inserted into the flying body 43. The other open end portion 411 of the ejection section 41 communicates with the gas introduction path 45. Further, the end portion 411 of the ejection section 41 is formed in a flange shape, for example, and supports one end portion of the flying body 43.

Specifically, one end of the gas introduction path 45 is inserted into the opening portion of the end portion 411 of the ejection section 41. As a result, the gas introduction path 45 and the internal space of the ejection section 41 communicate with each other.

A sealing device (gasket) 414 for preventing the gas introduced into the ejection section 41 from the gas introduction path 45 from leaking may be provided at the connecting portion between the ejection section 41 and the gas introduction path 45. Similarly, it may be possible to provide, at the end portion 410 side of the ejection section 41, a sealing device (gasket) 415 for preventing the gas introduced into the ejection section 41 from the gas introduction path 45 from leaking from the gap between the inner peripheral surface of the flying body 43 and the outer peripheral surface of the ejection section 41.

The flying body 43 is a device configured to discharge the parachute 400 to the outside of the parachute accommodation section 40 to assist the opening (deployment) of the parachute 400. The flying body 43 is made of, for example, a resin material or a metal material. The flying body 43 is formed, for example, in a bar shape. More specifically, as illustrated in FIG. 4, the flying body 43 is formed in, for example, a partially hollow cylindrical shape (for example, a hollow bullet shape).

The flying body 43 is engaged with the ejection section 41 in a connected state with the parachute 400. Specifically, the flying body 43 is connected to the parachute 400 via the connection line 46 at one end portion side of the flying body 43. The ejection section 41 is inserted into the flying body 43 at the other end portion side of the flying body 43. To be specific, the ejection section 41 is inserted into the flying body 43 such that a bottom surface 430 in the flying body 43 and the end portion 410 formed with the opening portion 410a of the ejection section 41 face each other. Also, the flying body 43 is supported on the flange-shaped end portion 411 of the ejection section 41.

Here, the bottom surface 430 of the flying body 43 and the end portion 410 of the ejection section 41 may be in contact with each other, or may be spaced apart from each other.

Note that, for prevention of the flying body 43 from falling out of the ejection section 41 when the parachute device 4 is not used, the flying body 43 may be fixed at the ejection section 41 by a pin (shear pin) 416. For example, as illustrated in FIG. 4, a through hole is formed at the side surface of the flying body 43, and a non-through hole is formed, for example, at the ejection section 41. Then, the pin 416 is inserted into the through hole of the flying body 43 and the non-through hole of the ejection section 41 in a state where the through hole of the flying body 43 and the non-through hole of the ejection section 41 overlap each other. Thus, when the parachute device 4 is not used, the flying body 43 is fixed at the ejection section 41.

Here, the pin 416 is configured to be breakable by a force applied to the pin 416 in the ejection direction of the flying body 43 when the flying body 43 is ejected. According to this configuration, there is no possibility that the pin 416 interferes with the ejection of the flying body 43. For example, an aluminum alloy, a resin, and the like is preferably used as the pin 416.

The gas introduction path 45 is a tube for introducing the gas generated from the gas generating device 44 to the ejection section 41. The gas introduction path 45 extends along the inner peripheral surfaces of the bottom surface portion 403 and the side wall portion 401 of the parachute accommodation section 40 from a gas discharge port 445 of the gas generating device 44 to the end portion 411 of the ejection section 41.

The gas introduction path 45 is made of a metal material such as stainless steel or a resin material.

The cover member 47 is a component for preventing contact between the flying body 43 and the ejection section 41, and the parachute 400. The cover member 47 is disposed between the parachute 400, and the flying body 43 and the ejection section 41, in the parachute accommodation section 40 in a form surrounding the flying body 43 held by the ejection section 41. The cover member 47 is made of, for example, a resin material or a metal material such as stainless steel.

As illustrated in FIGS. 3 and 4, the cover member 47 extends from the opening portion side of the side wall portion 401 of the parachute accommodation section 40 toward the bottom surface portion 403 side, and is fixed on the side wall portion 401. The cover member 47 is formed in a cylindrical shape including an opening portion in the circumferential direction, for example. The cross-sectional shape of the cover member 47 as viewed from the axial direction of the cover member 47 is U-shaped. The cover member 47 is fixed at the side wall portion 401 to close the opening portion in the circumferential direction, for example. The cover member 47 and the side wall portion 401 define an accommodation space capable of accommodating the flying body 43, the ejection section 41, and the gas introduction path 45.

Each ejection section 41 is fixed at the inner peripheral surface of the corresponding cover member 47. For example, as illustrated in FIG. 4, a side surface of the flange-shaped end portion 411 of the ejection section 41 is joined along the inner peripheral surface of the cover member 47.

The gas generating device 44 is a device configured to generate gas being the basis of a thrust force for ejecting the flying body 43 from the ejection section 41. The gas generating device 44 is fixed in the parachute accommodation section 40. For example, as illustrated in FIGS. 3 and 4, the gas generating device 44 is disposed at a central portion (at the central axis P) of the parachute accommodation section 40 when viewed from the opening portion side of the parachute accommodation section 40, and is fixed on the bottom portion 402 in the parachute accommodation section 40.

As illustrated in FIG. 4, the gas generating device 44 includes a housing 444, a gas generating agent 441, an ignition agent 442, and a sealing member 443.

The housing 444 holds the gas generating agent 441. The housing 444 is formed in a dome shape, for example, and, together with the bottom portion 402 of the parachute accommodation section 40, forms a gas discharge chamber 446, the gas generated from the gas generating agent 441 being discharged into the gas discharge chamber 446. Specifically, as illustrated in FIG. 4, the gas discharge chamber 446 is defined by the bottom surface 404a of the base portion 404 and the inner wall surface of the housing 444, and the gas generating agent 441 and the ignition agent 442 are disposed at some regions of the gas discharge chamber 446.

The housing 444 may further include the parachute attachment section 447 for fixing the parachute 400 at the parachute accommodation section 40. Specifically, as illustrated in FIG. 4, one end of the hanging line 461 of the parachute 400 is connected to the parachute attachment section 447, so that the parachute 400 and the parachute accommodation section 40 are connected to each other.

The housing 444 is made of, for example, resin. Preferably, the housing 444 is configured of fiber-reinforced plastics (FRP), and the like. Note that the housing 444 is not limited to being made of resin, and may be made of metal.

As illustrated in FIG. 4, the housing 444 is fixed at the bottom surface 404a of the base portion 404 so as to seal the gas discharge chamber 446 in a state of accommodating the gas generating agent 441 and the ignition agent 442 inside the housing 444.

The gas generating agent 441 is disposed in the gas discharge chamber 446 in a state where a part of the surface is covered with the sealing member 443. The sealing member 443 is made of a material easily broken by the pressure of the generated gas when the gas is generated from the gas generating agent 441. For example, the sealing member 443 is a thin film of polyester, and the like.

The ignition agent 442 is an agent for igniting the gas generating agent 441. The ignition agent 442 is formed at one end of the lead wire 48. For example, a liquid ignition agent mixed with a resin, and the like is applied to the tip of the lead wire 48 and solidified, and thus the ignition agent 442 can be fixed at one end of the lead wire 48.

For example, the ignition agent 442 is fixed in the housing 444 in a state where a portion of the ignition agent 442 is in contact with the gas generating agent 441 (for example, a state where at least a portion of the ignition agent 442 is embedded in the gas generating agent 441).

The ignition agent 442 is electrically connected to the ejection control section 42 through the lead wire 48. The ignition agent 442 is ignited in response to an ignition signal output from the ejection control section 42, and the gas generating agent 441 is caused to chemically react to generate gas.

In the present embodiment, the gas generating agent 441 and the ignition agent 442 are non-detachably fixed in the housing 444. That is, the gas generating agent 441 and the ignition agent 442 are not provided at the housing 444 in a form detachable from the housing 444, for example, as a replaceable cartridge, but formed integrally with the housing 444.

The gas discharge port 445 for discharging the gas generated in the gas discharge chamber 446 to the outside is formed at the housing 444. The gas discharge port 445 is formed corresponding to each ejection section 41. In the present embodiment, since four ejection sections 41 are provided, the four gas discharge ports 445 are formed at the housing 444. One end of the corresponding gas introduction path 45 is inserted into and fixed at each gas discharge port 445.

Accordingly, the gas discharge chamber 446 and the internal space of each ejection section 41 communicate with each other via the gas introduction path 45, and the gas generated from the gas generating device 44 is introduced to the internal space of each ejection section 41 without leaking.

Next, a procedure of the opening of the parachute 400 of the parachute device 4 according to the present embodiment will now be described.

For example, when the state where the inclination of the aircraft body (aircraft body unit 2) of the flight device 1 exceeds the inclination threshold value 29 due to strong wind continues for a predetermined period while the flight device 1 equipped with the parachute device 4 is flying, and the abnormality detection section 15 determines that the state is abnormal, the fall control section 16 at the flight device 1 side transmits a control signal for instructing the opening of the parachute 400 to the ejection control section 42 of the parachute device 4.

The ejection control section 42 outputs an ignition signal to the gas generating device 44 through the lead wire 48 when receiving the control signal for instructing the opening of the parachute 400. Specifically, the ejection control section 42 causes a predetermined current to flow through the lead wire 48 to ignite the ignition agent 442 formed at one end of the lead wire 48.

Due to the ignition of the ignition agent 442, the gas generating agent 441 being in contact with the ignition agent 442 chemically reacts to generate gas. As the pressure of the gas increases, the gas breaks through the sealing member 443, and the gas discharge chamber 446 is filled with the gas.

Thereafter, the gas in the gas discharge chamber 446 is introduced into the interior of each ejection section 41 from the corresponding gas discharge port 445 through the corresponding gas introduction path 45, and is discharged from the opening portion 410a at the end portion 410 side of each ejection section 41. The flying body 43 held by each of the ejection sections 41 moves in the direction along the central axis Q of the ejection section 41 by receiving the pressure of the gas discharged from the opening portion 410a of the ejection section 41, forcibly opens the lid 49, and is ejected to the outside of the parachute accommodation section 40.

Figure 6:
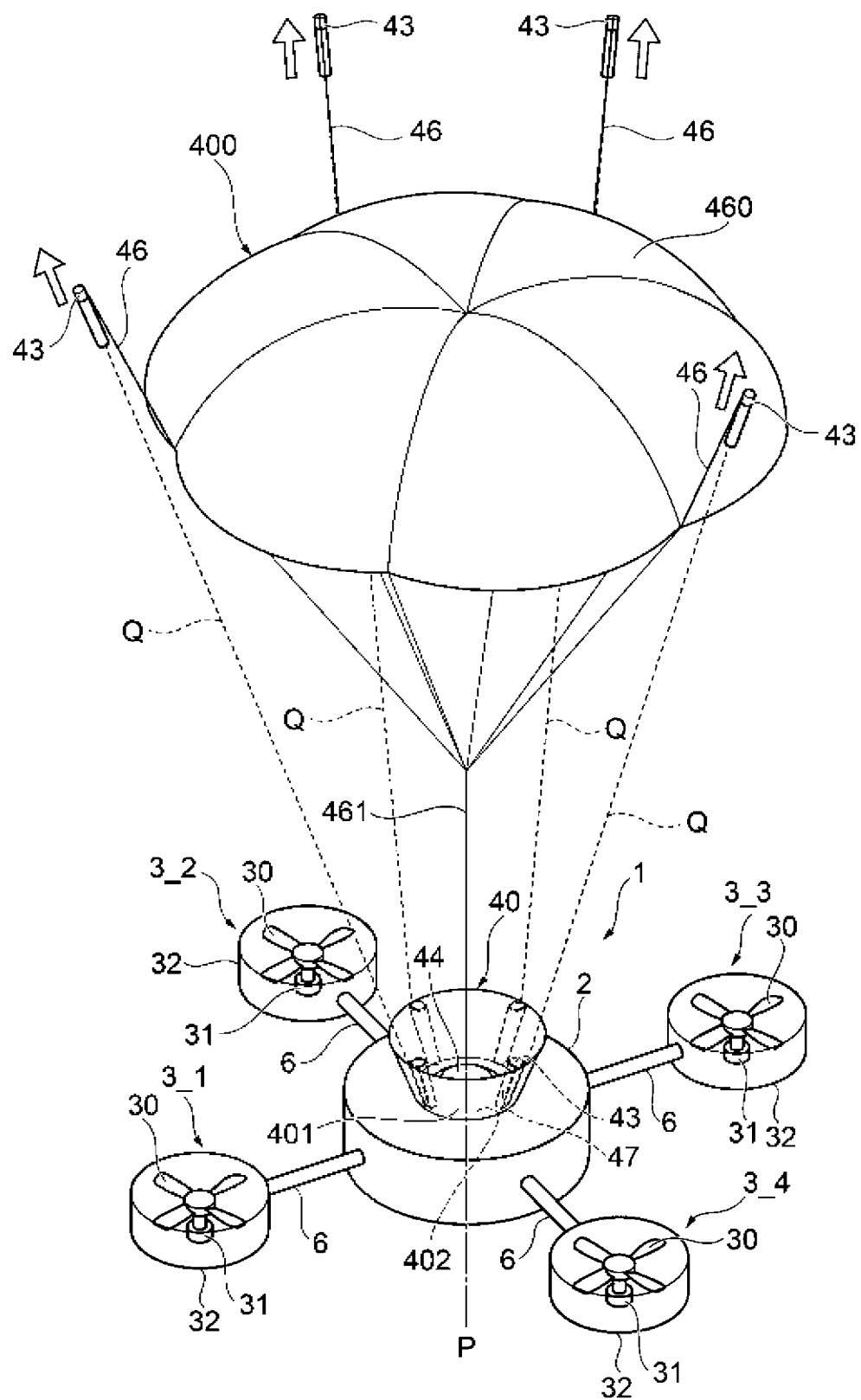
FIG. 6 is a diagram schematically illustrating an open state of a parachute of a flight device according to the present embodiment.

FIG. 6 is a diagram schematically illustrating an open state of the parachute 400 of the flight device 1 according to the present embodiment.

When each flying body 43 is ejected from the parachute accommodation section 40, the parachute 400 (parachute body 460) is pulled by each flying body 43 via the connection line 46, and the parachute 400 is discharged from the parachute accommodation section 40. The parachute body 460 of the parachute 400 discharged externally is further pulled by each flying body 43, so that the parachute body 460 in the folded state is deployed. As a result, as illustrated in FIG. 6, air enters the interior of the parachute body 460, and then the parachute body 460 opens.

As described above, each flying body 43 flies out in a direction of extension of the central axis Q of the ejection section 41 (the axial direction Q). That is, each flying body 43 flies in a direction away from the central axis P of the parachute accommodation section 40. Accordingly, each flying body 43 can effectively pull the parachute body 460 of the discharged parachute 400 from the apex portion toward the edge (peripheral edge) side, compared to a case of ejecting the flying body 43 directly upward (in a direction parallel to the central axis P of the parachute accommodation section 40). As a result, the parachute body 460 can be quickly expanded and air can be easily trapped.

As described above, the parachute device 4 according to the present embodiment includes the parachute accommodation section 40 formed in a tubular shape including an opening at one end and a bottom at another end, the parachute accommodation section 40 being configured to accommodate the parachute 400 inside the parachute accommodation section 40, the at least one flying body 43 formed in a tubular shape including an opening at one end and a bottom at another end, the flying body 43 being connected to the parachute 400, the tubular ejection section 41 fixed at the parachute accommodation section 40, and configured to hold the flying body 43 and eject the held flying body 43, the gas generating device 44 fixed at the parachute accommodation section 40, and configured to generating gas, and the gas introduction path 45 configured to introduce the gas generated from the gas generating device 44 to the interior of the ejection section 41. The one open end portion 410 of the ejection section 41 is inserted into the flying body 43, and the other open end portion 411 of the ejection section 41 communicates with the gas introduction path 45.

According to this configuration, as described above, the gas generated from the gas generating device 44 is discharged from the ejection section 41 through the gas introduction path 45, and thus the flying body 43 can be ejected from the ejection section 41 due to the pressure of the gas. As a result, since the parachute body 460 of the parachute 400 connected to the flying body 43 is pulled by the flying body 43, the parachute body 460 can easily trap air, and the parachute 400 can be opened immediately.

Therefore, even when a rotary wing aircraft capable of maintaining a stationary state in the sky such as the flight device 1 cannot obtain an effect of an airflow at the time of falling, attaching the parachute device 4 according to the present embodiment makes it possible to quickly and reliably open the parachute and cause the parachute to fall slowly.

Additionally, in the parachute device 4 according to the present embodiment, the ejection section 41 holds the flying body 43 in a state where the open end portion 410 of the ejection section 41 is inserted into the flying body 43. In other words, the flying body 43 is disposed covering the end portion 410 (tip portion) of the ejection section 41 formed with the opening portion 410a for discharging the gas.

According to this configuration, for example, compared to a configuration of inserting the flying body 43 into the ejection section 41 like a bullet, it is easy to increase the size and weight of the flying body 43 and to enhance the function of the flying body 43 as an inertial body without increasing the size of the ejection section 41 or the parachute accommodation section 40. Thus, it is possible to facilitate the opening of the parachute 400 while suppressing an increase in size of the entire parachute device 4.

Additionally, in the parachute device 4 according to the present embodiment, the gas generating device 44 includes the gas generating agent 441 generating gas, and the housing 444 fixed at the bottom surface of the parachute accommodation section 40 and non-detachably accommodating the gas generating agent 441. In the parachute device 4, the gas discharge chamber 446 is formed by the housing 444 and the inner bottom surface 404a of the parachute accommodation section 40, the gas generated from the gas generating agent 441 being discharged into the gas discharge chamber 446, and the gas discharge chamber 446 communicates with the interior of the ejection section 41 via the gas introduction path 45.

According to this configuration, the number of components is reduced as compared with a case of forming the gas generating agent 441 as a cartridge detachable from the housing 444, and thus a reduction in manufacturing cost can be expected.

The parachute device 4 according to the present embodiment further includes the cover member 47 disposed between the parachute 400 and the flying body 43 in the parachute accommodation section 40 in a form surrounding the flying body 43 held by the ejection section 41.

According to this configuration, since the parachute 400 can be prevented from contacting the flying body 43 in the parachute accommodation section 40, it is possible to prevent the flying body 43 from contacting the parachute 400 and damaging the parachute 400 when the flying body 43 is ejected. This configuration makes it possible to further improve the reliability of the parachute device 4.

The parachute device 4 according to the present embodiment further includes the lid 49 covering the opening portion of the parachute accommodation section 40. According to this configuration, since it is possible to prevent foreign matter such as rain or dust from entering the interior of the parachute accommodation section 40, it is possible to prevent deterioration such as corrosion of the parachute 400, the gas generating device 44, and the like accommodated in the parachute accommodation section 40, and it is possible to further improve the reliability of the parachute device 4.

Additionally, the parachute device 4 according to the present embodiment includes a plurality of the flying bodies 43, and the ejection section 41 and the gas introduction path 45 are provided corresponding to each of the flying bodies 43. As illustrated in FIG. 3, the plurality of ejection sections 41 are disposed at equal intervals in the circumferential direction of a circle centered on the central portion (P) when viewed from the opening portion of the parachute accommodation section 40.

According to this configuration, since the parachute body 460 can be pulled with substantially equal forces from a plurality of directions when the parachute 400 is ejected, the parachute body 460 can be more easily opened, and the reliability of the parachute device 4 can be further enhanced.

Expansion of Embodiment

The invention conceived by the present inventors has been specifically described above based on the embodiments. However, the present invention is not limited to the embodiments, and of course, various modifications can be made without departing from the gist of the present invention.

For example, in the above-described embodiment, a case where the parachute accommodation section 40 has a tapered tubular shape (truncated conical shape) has been described as an example, but the embodiment is not limited to the case, and the parachute accommodation section 40 may have a general cylindrical shape that is not tapered, or may have a polygonal column shape (for example, a quadrangular column shape).

REFERENCE SIGNS LIST

1 Flight device
2 Aircraft body unit
3, 3_1 to 3_n Thrust force generation section
4 Parachute device
5 Notification device
6 Arm section
9 External device
11 Power supply section
12 Sensor section
13, 13_1 to 13_n Motor drive section
14 Flight control section
15 Abnormality detection section
16 Fall control section
17 Communication section
18 Storage section
22 Battery
23 Power supply circuit
24 Angular velocity sensor
25 Acceleration sensor
26 Magnetic sensor
27 Angle calculation section
28 Remaining capacity threshold value
29 Inclination threshold value
30 Propeller
31 Motor
32 Case
40 Parachute accommodation section
41 Ejection section
42 Ejection control section
43 Flying body
44 Gas generating device
45 Gas introduction path
46 Connection line
47 Cover member
48 Lead wire
49 Lid
50 Flying body ejection mechanism
400 Parachute
401 Side wall portion
402 Bottom portion
403 Bottom surface portion
404 Base portion
404a Bottom surface
405 Accommodation space
410, 411 End portion
410a Opening portion
414, 415 Sealing device (gasket)
416 Pin (shear pin)
430 Bottom surface
441 Gas generating agent
442 Ignition agent
443 Sealing member
444 Housing
445 Gas discharge port
446 Gas discharge chamber
447 Parachute attachment section
460 Parachute body (canopy)
461 Hanging line
490 Sealing device (gasket)
491 Fitting
P Central axis (central portion) of parachute accommodation section 40
Q Central axis of ejection section 41

The invention claimed is:

1. A parachute device comprising:
a parachute;
a parachute accommodation section formed in a tubular shape including an opening at one end and a bottom at another end, the parachute accommodation section being configured to accommodate the parachute inside the parachute accommodation section;
at least one passive flying body formed in a tubular shape including an opening at one end and a bottom at another end, the flying body being connected to the parachute;
a tubular ejection section fixed at the parachute accommodation section, and configured to hold the flying body and eject the held flying body;
a gas generating device fixed at the parachute accommodation section, and configured to generate gas;

a gas introduction path configured to introduce the gas generated from the gas generating device to an interior of the ejection section; and
a cover member disposed between the parachute and the flying body in the parachute accommodation section in a form surrounding the flying body held by the ejection section, wherein
one open end portion of the ejection section is inserted into the flying body, and another open end portion of the ejection section communicates with the gas introduction path, wherein
the bas generating device includes,
 a gas generating agent configured to generate the gas, and
 a housing fixed at an inner bottom surface of the parachute accommodation section, and configured to non-detachably accommodate the gas generating agent,
 a gas discharge chamber is formed by the housing and the inner bottom surface of the parachute accommodation section, the as generated from the gas generating agent being discharged into the gas discharge chamber, and
 the gas discharge chamber and the interior of the ejection section communicate with each other via the gas introduction path, wherein
 the parachute accommodation section has a side wall portion having a tube shape and a bottom portion formed so as to close an opening at one end side of the side wall portion, wherein
 the cover member is formed in a cylindrical shape including an opening portion in a circumferential direction, wherein
 a cross-sectional shape of the cover member as viewed from an axial direction of the cover member is U-shaped, wherein
 the cover member, in the parachute accommodation section, extends from the opening portion side of the side wall portion toward a bottom surface portion side and is fixed at the side wall portion to close the opening portion in the circumferential direction.

2. The parachute device according to claim 1, further comprising a lid configured to cover an opening portion of the parachute accommodation section.

3. The parachute device according to claim 1, comprising a plurality of the flying bodies, wherein
the ejection section and the gas introduction path are provided corresponding to each of the flying bodies,
the parachute accommodation section has a tubular shape,
the gas generating device is disposed at a central portion of the parachute accommodation section when viewed from an opening portion side of the parachute accommodation section, and
a plurality of the ejection sections are disposed at equal intervals in a circumferential direction of a circle centered on the central portion when viewed from the opening portion side of the parachute accommodation section.

4. The parachute device according to claim 1, wherein
the end portion of the ejection section is formed in a flange shape, wherein
a side surface of the flange-shaped end portion of the ejection section is joined along an inner peripheral surface of the cover member.

5. A flight device comprising:
an aircraft body unit;
a thrust force generation section connected to the aircraft body unit and configured to generate a thrust force;
a flight control section configured to control the thrust force generation section;
an abnormality detection section configured to detect an abnormality during flying;
the parachute device according to claim 1; and
a fall control section configured to cause the flying body to be ejected from the ejection section in response to detection of the abnormality by the abnormality detection section.

6. A flying body ejection mechanism comprising:
a passive flying body connectable to a parachute;
a parachute accommodation section formed in a tubular shape including an opening at one end and a bottom at another end, the parachute accommodation section being capable of accommodating the parachute inside the parachute accommodation section;
a tubular ejection section fixed at the parachute accommodation section, and configured to hold the flying body and eject the held flying body;
a gas generating device fixed at the parachute accommodation section, and configured to generate gas;
a gas introduction path configured to introduce the gas generated from the gas generating device to an interior of the ejection section; and
a cover member disposed in the parachute accommodation section in a form surrounding the flying body held by the ejection section, wherein
the flying body is formed in a tubular shape including an opening at one end and a bottom at another end, and
one open end portion of the ejection section is inserted into the flying body, and another open end portion of the ejection section communicates with the gas introduction path, wherein
the gas generating device includes,
 a gas generating agent configured to generate the gas, and
 a housing fixed at an inner bottom surface of the parachute accommodation section, and configured to non-detachably accommodate the gas generating agent,
 a gas discharge chamber is formed by the housing and the inner bottom surface of the parachute accommodation section, the gas generated from the gas generating agent being discharged into the gas discharge chamber, and
 the gas discharge chamber and the interior of the ejection section communicate with each other via the gas introduction path, wherein
 the parachute accommodation section has a side wall portion having a tube shape and a bottom portion formed so as to close an opening at one end side of the side wall portion, wherein
 the cover member is formed in a cylindrical shape including an opening portion in a circumferential direction, wherein
 a cross-sectional shape of the cover member as viewed from an axial direction of the cover member is U-shaped, wherein
the cover member, in the parachute accommodation section, extends from the opening portion side of the side wall portion toward a bottom surface portion side and is fixed at the side wall portion to close the opening portion in the circumferential direction.

* * * * *